United States Patent [19]
Venti

[11] Patent Number: 5,660,144
[45] Date of Patent: Aug. 26, 1997

[54] PET BARRIER AND METHOD THEREFOR

[76] Inventor: David R. Venti, 1283 W. Parklane Blvd., #110, Chandler, Ariz. 85224

[21] Appl. No.: 546,906

[22] Filed: Oct. 23, 1995

[51] Int. Cl.$^6$ .................................................. A01K 29/004
[52] U.S. Cl. ........................................ 119/416; 256/1
[58] Field of Search .......................... 119/416, 446, 119/506, 507, 510, 522, 523, 524; 49/65; 160/97, 98, 99, 100; 256/1, 19

[56] References Cited

U.S. PATENT DOCUMENTS

| | | | |
|---|---|---|---|
| 1,806,495 | 5/1931 | Parker | 160/99 |
| 1,823,290 | 9/1931 | Prawalsky | 160/98 |
| 2,514,438 | 7/1950 | Bardega | 160/99 |
| 3,155,146 | 11/1964 | Malouf et al. | 160/100 |
| 3,220,464 | 11/1965 | Wise | 160/24 U X |
| 4,119,301 | 10/1978 | Payne | 256/1 X |
| 4,844,420 | 7/1989 | Oster | 256/1 |

FOREIGN PATENT DOCUMENTS 544974   8/1957   Canada ................... 160/100

Primary Examiner—Thomas Price
Attorney, Agent, or Firm—Harry M. Weiss; Jeffrey D. Moy; Harry M. Weiss & Associates, P.C.

[57] ABSTRACT

The present invention is directed to an improved pet barrier. The pet barrier is preferably comprised of a net or fabric barrier, a container for retaining one end of the barrier and for housing the barrier when not in use, and hooks for attaching the second or other end of the barrier to a door, doorway, or wall. In the preferred embodiment, the barrier is a net, and the container which is attached to one end of the barrier is attached to the doorway or wall, while the second end of the barrier is releasably attached to the door.

14 Claims, 1 Drawing Sheet

PET BARRIER AND METHOD THEREFOR

BACKGROUND OF THE INVENTION

1. Field of Invention

This invention relates generally to pet barriers and methods therefor and, more particularly, to a pet barrier and method therefor wherein the pet barrier is affixed at one end to a door frame and at the other end to a door so as to prevent small animals such as dogs and cats from exiting through a doorway when a door is opened.

2. Background of the Invention

Owners of small pets such as dogs and cats have long struggled with a vexing problem—how to keep the dog or cat from running through a doorway when the door is opened. At one time or another, most pet owners have had the experience of watching the dog or cat run through a doorway just as the door has been opened in response to a knock or a ring of the doorbell. Efforts to prevent such animal escape, either by placing a leg in front of the pet or by opening the door only a small amount, are generally unsuccessful.

There currently exist pet barriers for use in residential doorways. These barriers are generally made of wood or plastic and are made to expand to the width of the doorway, and to occupy approximately the bottom third or fourth of the doorway. There are drawbacks to these designs, however. First, these prior art barriers generally require that the door be kept open while the barrier is in place, and such barriers generally may not be used with a closed door—thus making these barriers impractical for use with a door that opens to the outside of the house. Moreover, those barriers which are not hinged are not easily removed when not in use. With respect to those barriers that may be used with a closed door, such barriers occupy the space in front of the closed door and, as a result, would be unsightly from the outside of a home if used in the doorway in the front entrance of a home.

Therefore, a need existed to provide an improved pet barrier and method for use in a doorway with a door—such as the front door to a home—that must be closed. The improved pet barrier and method must be relatively simple to engage and disengage, and must not permanently occupy a space in front of the door.

SUMMARY OF THE INVENTION

In accordance with one embodiment of the present invention, it is an object of the present invention to provide an improved pet barrier and method therefor.

It is another object of the present invention to provide a pet barrier and method therefor wherein the barrier may be affixed on one end substantially to the frame of the doorway, and on the other end substantially to the side of the door.

It is a still further object of the present invention to provide a pet barrier and method therefor wherein one end of the barrier may be releasably engaged.

It is a still further object of the present invention to provide a pet barrier and method therefor wherein the pet barrier comprises a net or other fabric, which material may be retracted into a container when the pet barrier is not engaged

BRIEF DESCRIPTION OF THE PREFERRED EMBODIMENTS

In accordance with one embodiment of the present invention, a pet barrier is disclosed. The pet barrier is comprised of a container, a material type barrier such as a net or fabric that is attached on one end to a container and that may be retracted into the container, attaching means for attaching the container substantially to one of a frame of a doorway and substantially to a side of a door, and fastening means for releasably attaching the opposite end of the net or fabric barrier substantially to one of a side of a door and substantially to a frame of a doorway.

In accordance with another embodiment of the present invention, a method for providing a pet barrier is disclosed. The method comprises the steps of: providing a container, providing a material type barrier such as a net or fabric that is attached on one end to a container and that may be retracted into the container, providing attaching means for attaching the container substantially to one of a frame of a doorway and substantially to a side of a door, and providing fastening means for releasably attaching the opposite end of the net or fabric barrier substantially to one of a side of a door and substantially to a frame of a doorway.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 also shows, in phantom, a perspective view of the pet barrier of the present invention, as installed with the container affixed to the door.

DETAILED DESCRIPTION OF THE PREFERRED EMBODIMENTS

Figure 1:
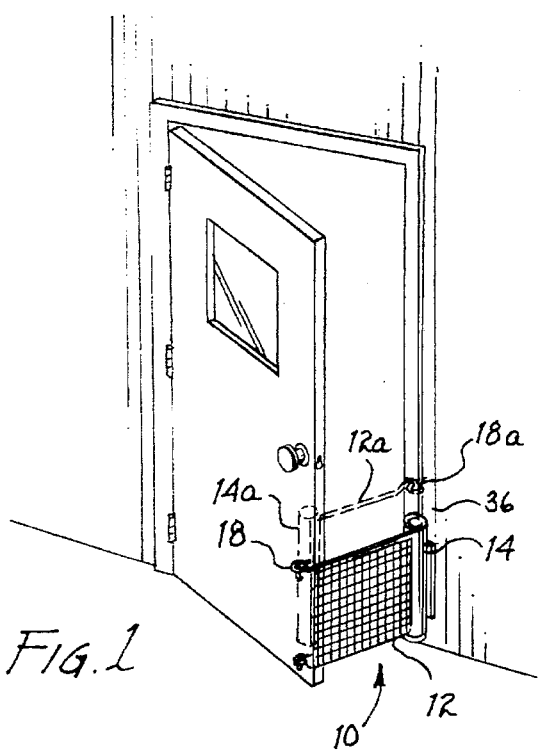
FIG. 1 is a perspective view of the pet barrier of the present invention, as installed with the container affixed to the doorway.
Figure 2:
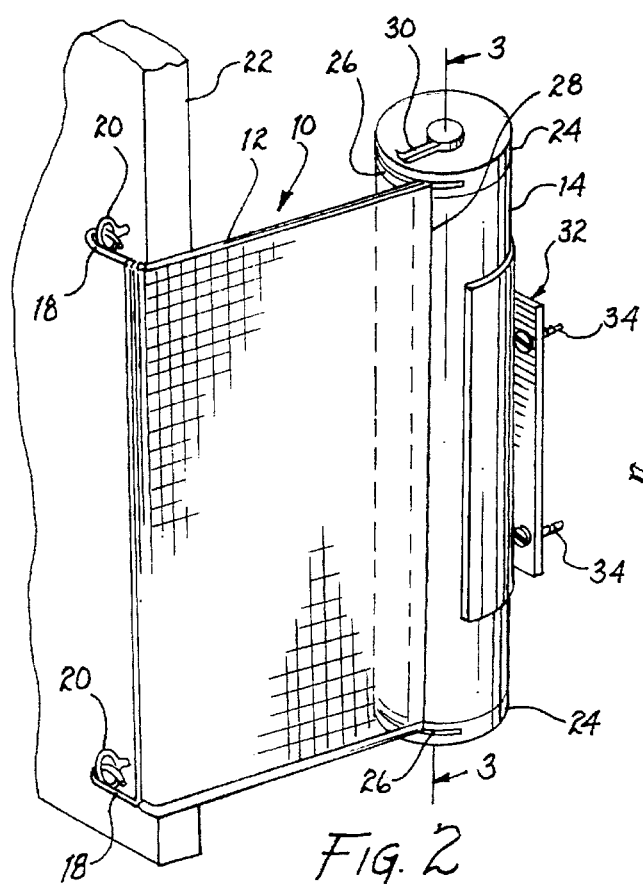
FIG. 2 is a close-up perspective view of the pet barrier of the present invention, as installed with the container affixed to the doorway.

Referring to the embodiment of FIGS. 1 and 2, reference FIG. 10 refers generally to the pet barrier of this invention. A net 12 is shown, in this embodiment, extending from a cylinder 14, with the proximate end of the net 12 affixed to a center rod 16 (see FIGS. 3 and 4) that extends through the middle of the cylinder 14, and which rod 16 extends from the top of the cylinder 14 to its bottom. At the distal end of the net 12, there are affixed in each corner a hook 18 (see FIG. 2). Each of the hooks 18 may be releasably inserted into an eyelet 20, which eyelets 20 are attached in this embodiment to a door 22. At each of the two ends of the cylinder 14 there is a cap 24, each of which contains a slot 26. Running from the top to the bottom of the cylinder 14 is an elongated opening 28, through which the net 12 may be retracted into or extended from the inner portion of the cylinder 14. When the net 12 is retracted into the cylinder 14, the hooks 18 enter the cylinder 14 through the slots 26. At the top end of the cylinder 14, there is a latch or turning means 30, which is attached to the rod 16. When a user wishes to extend the net 12 from the cylinder 14, he or she turns the latch or turning means 30, which causes the net 12 to rotate until the hooks 18 pass through the slots 26, which hooks 18 may then be subsequently grasped by a user to pull the net 12 back out from inside the cylinder 14. In this embodiment, the cylinder 14 is affixed to a bracket 32, which bracket 32 consists of a semicircular portion which partially circumscribes the cylinder 14 and a straight portion through which are affixed two screws 34 to a doorway 36. The net 12 may be retracted into the cylinder 14, which cylinder 14 is preferably spring-loaded in a manner that is familiar to those skilled in the art, by pulling outward on the net 12 and then releasing it.

FIG. 1 also shows, in phantom, a different embodiment of the pet barrier of this invention. In this embodiment, a cylinder 14a is shown attached to a door, a retractable net 12a is shown extending from the cylinder 14a, and the net 12a is shown attached to hooks 18a (only one of which is shown in FIG. 1).

Figure 3:
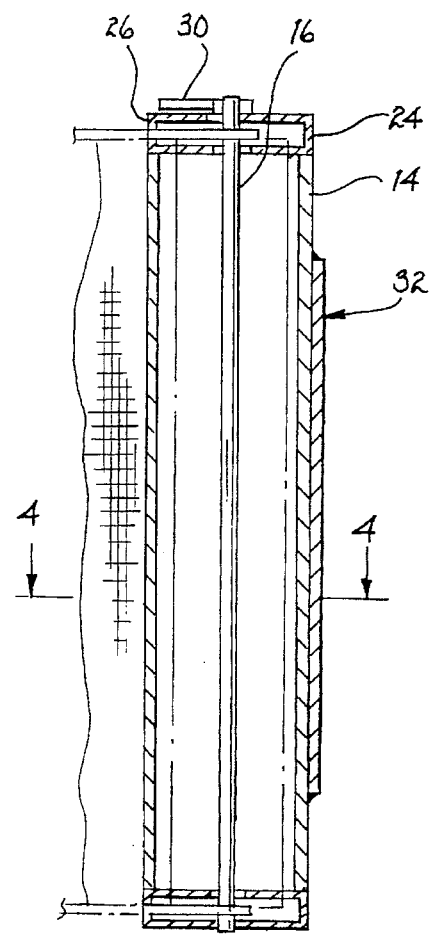
FIG. 3 is a cross-sectional view of the cylinder of the pet barrier of FIG. 2 taken along line 3—3 of FIG. 2.

Referring to FIG. 3, a cross-sectional view of the cylinder 14 of FIG. 2 is shown. In this figure, the center rod 16 is seen extending from the top to the bottom of the cylinder 14, and the latch or turning means 30 is seen attached to the top of the rod 16.

Figure 4:
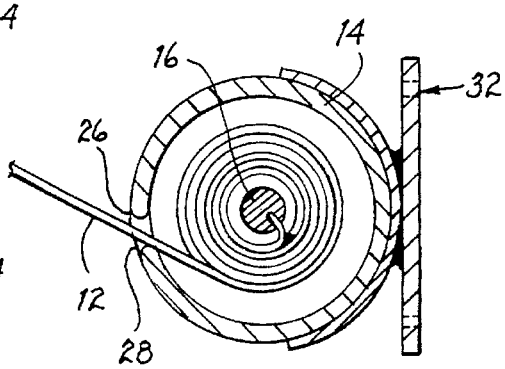
FIG. 4 is a cross-sectional view of the container of the pet barrier of FIG. 2 taken along line 4—4 of FIG. 3.

Referring to FIG. 4, a cross-sectional view of the cylinder 14 of FIG. 2 is shown. In this figure, the net 12 is seen wrapped around the rod 16, with a portion of the net 12 extending through the opening 28 in the cylinder 14.

While the invention has been particularly shown and described with reference to preferred embodiments thereof, it will be understood by those skilled in the art that the foregoing and other changes in form and details may be made therein without departing from the spirit and scope of the invention. For example, it may be possible to utilize the barrier of the subject invention to prevent small children from passing through.

I claim:

1. A pet barrier comprising, in combination:
   barrier means comprising a substantially rectangle shaped material and having a bottom portion and a top portion for blocking the path of a small animal;
   said barrier means having a width between said bottom portion and said top portion sufficient to prevent said small animal from passing thereover;
   container means having a bottom portion and a top portion corresponding to said bottom portion and said top portion of said barrier means for retaining a first end of said barrier means and for housing said barrier means;
   said container means comprising:
   retracting means for retracting said barrier means into said container means; and
   attaching means for attaching said container means to at least one of a door, a door frame, and a wall so that said bottom portion of said container means is proximate a base portion of said door, door frame, and wall; and
   clasping means attached to a second end of said barrier means for releasably attaching said barrier means to at least one of a door, a door frame, and a wall so that said bottom portion of said barrier means is proximate a base portion of said at least one of said door, door frame, and wall.

2. A pet barrier in accordance with claim 1, wherein said barrier means comprises a net.

3. A pet barrier in accordance with claim 1, wherein said barrier means comprises a fabric.

4. A pet barrier in accordance with claim 1, wherein said container means comprises a cylinder.

5. A pet barrier in accordance with claim 1, wherein said clasping means comprises, in combination:
   two hooks located at said second end of said barrier means; and
   two eyelets located on at least one of a door, door frame, and a wall.

6. A pet barrier comprising, in combination:
   barrier means for blocking the path of a small animal;
   clasping means attached to a first end of said barrier means for releasably attaching said barrier means to at least one of a door, a door frame, and a wall;
   said clasping means comprises, in combination:
   two hooks located at said first end of said barrier means; and
   two eyelets located on at least one of a door, door frame, and a wall;
   a cylinder for retaining a second end of said barrier means and for housing said barrier means;
   said cylinder further comprises:
   hook receiving means located substantially at a top portion of said cylinder for receiving one of said hooks;
   hook receiving means located substantially at a bottom portion of said cylinder for receiving the other one of said hooks; and
   elongated opening means extending substantially from said top portion of said container means to said bottom portion of said container means for permitting the passage of said barrier means into and out of said container means;
   retracting means for retracting said barrier means into said container means; and
   attaching means for attaching said container means to at least one of a door, a door frame, and a wall.

7. A pet barrier in accordance with claim 4, wherein said cylinder further comprises turning means for turning said barrier means and causing said hooks to protrude through said hook receiving means.

8. A method for providing a pet barrier, comprising the steps of:
   providing barrier means comprising a substantially rectangle shaped material and having a bottom portion and a top portion for blocking the path of a small animal;
   said barrier means having a width between said bottom portion and said top portion sufficient to prevent said small animal from passing thereover;
   providing container means having a bottom portion and a top portion corresponding to said bottom portion and said top portion of said barrier means for retaining a first end of said barrier means and for housing said barrier means;
   said step of providing said container means further comprising the steps of:
   providing retracting means for retracting said barrier means into said container means; and
   providing attaching means for attaching said container means to at least one of a door, a door frame, and a wall so that said bottom portion of said container means is proximate a base portion of said door, door frame, and wall; and
   providing clasping means attached to a second end of said barrier means for releasably attaching said barrier means to at least one of a door, a door frame, and a wall so that said bottom portion of said barrier means is proximate a base portion of said at least one of said door, door frame, and wall.

9. The method of claim 8, wherein said step of providing barrier means further comprises the step of providing a net.

10. The method of claim 8, wherein said step of providing barrier means further comprises the step of providing a fabric.

11. The method of claim 8, wherein said step of providing container means further comprises the step of providing a cylinder.

12. The method of claim 8, wherein the step of providing said clasping means comprises, in combination:

providing two hooks located at said second end of said barrier means; and providing two eyelets located on at least one of a door, door frame, and a wall.

13. The method of claim 12, wherein the step of providing said cylinder further comprises the step of providing turning means for turning said barrier means and causing said hooks to protrude through said hook receiving opening means.

14. A method for providing a pet barrier, comprising the steps of:

providing barrier means for blocking the path of a small animal;

providing clasping means attached to a first end of said barrier means for releasably attaching said barrier means to at least one of a door, a door frame, and a wall;

said clasping means comprises, in combination:

two hooks located at said first end of said barrier means; and two eyelets located on at least one of a door, door frame, and a wall;

providing a cylinder for retaining a second end of said barrier means and for housing said barrier means;

wherein the step of providing said cylinder further comprises the steps of:

providing hook receiving means located substantially at a top portion of said cylinder for receiving one of said hooks;

providing hook receiving means located substantially at a bottom portion of said cylinder for receiving the other one of said hooks; and providing elongated opening means extending substantially from said top portion of said container means to said bottom portion of said container means for permitting the passage of said barrier means into and out of said container means;

providing retracting means for retracting said barrier means into said container means; and providing attaching means for attaching said container means to at least one of a door, a door frame, and a wall.

* * * * *